United States Patent
Baumann

[11] Patent Number: 6,145,406
[45] Date of Patent: Nov. 14, 2000

[54] TELESCOPIC STEERING COLUMN FOR MOTOR VEHICLES

[75] Inventor: Janet Baumann, Diepholz, Germany

[73] Assignee: Lemförder Metallwaren AG, Germany

[21] Appl. No.: 09/257,428

[22] Filed: Feb. 25, 1999

[30] Foreign Application Priority Data

Feb. 25, 1998 [DE] Germany .......................... 198 07 666

[51] Int. Cl.[7] ...................................................... B62D 1/16
[52] U.S. Cl. ........................................ 74/492; 403/DIG. 3
[58] Field of Search .............................. 74/491, 492, 493,
74/495; 280/777; 403/DIG. 3, 2

[56] References Cited

U.S. PATENT DOCUMENTS

| | | | |
|---|---|---|---|
| 5,221,154 | 6/1993 | Foulquier et al. | 403/12 |
| 5,560,257 | 10/1996 | DeBisschop et al. | 74/492 |
| 5,564,313 | 10/1996 | Hoblingre | 74/492 |
| 5,669,633 | 9/1997 | Näff et al. | 280/777 |

*Primary Examiner*—David Fenstermacher
*Attorney, Agent, or Firm*—McGlew and Tuttle, P.C.

[57] ABSTRACT

A telescopic steering column for motor vehicles with a steering shaft 1, whose axial, plastic-coated teeth 1.1, which are arranged at least in some areas, engage complementary teeth 2.1 of the steering column jacket 2, which accommodates and guides the steering shaft and which is accommodated in a housing of the steering column, wherein a securing element 3 engages a recess 2.2 of the steering column jacket 2 with at least one hook-shaped claw 3.1 on one side and is supported at or in the end section of the steering column jacket 2 via a radially directed shoulder 3.2 on the other side and thus forms an axial displacement limitation of the steering shaft 1 in at least one direction.

16 Claims, 4 Drawing Sheets

TELESCOPIC STEERING COLUMN FOR MOTOR VEHICLES

FIELD OF THE INVENTION

The present invention pertains to a telescopic steering column for motor vehicles with a steering shaft having axial, plastic-coated teeth provided at least in some areas which engage complementary teeth of the steering column jacket, which accommodates and guides the steering shaft and which is accommodated in a housing of the steering column via bearing elements.

BACKGROUND OF THE INVENTION

Various designs of steering columns have been known. In particular, simply or multiply telescopic steering columns are advantageous, because the driver can position the steering wheel corresponding to his height in the vehicle, so that a comfortable, ergonomically favorable posture can be achieved at all times.

On the one hand, it must be guaranteed in such steering columns that the steering wheel can yield in the axial direction in the case of an accident in order to prevent serious injuries to the driver of the vehicle; on the other hand, an axial displacement limitation must be provided during the telescoping process.

SUMMARY AND OBJECTS OF THE INVENTION

The primary technical object of the present invention is therefore to improve a telescopic steering column such that both the ability to be telescoped is guaranteed and a meaningful axial displacement limitation can be achieved with simple and inexpensive means.

According to the invention, a telescopic steering column is provided for motor vehicles with a steering shaft having axial plastic-coated teeth provided at least in some areas. These teeth engage the complementary teeth of the steering column jacket. The steering column jacket accommodates and guides the steering shaft and is accommodated in a housing of the steering column via bearing elements. A securing element engages on one side a recess of the steering column jacket with at least one hook-shaped claw and is supported on the one side in or at the end section of the steering column jacket via a radial shoulder and thus forms an axial displacement limitation of the steering shaft in at least one direction.

Thus, a telescopic steering column for motor vehicles has, to begin with, a steering shaft, which is provided, at least in some areas, with axial, preferably plastic-coated teeth. These teeth on the outer circumference of the steering shaft engage complementary teeth of the steering column jacket accommodating and guiding the steering shaft. The steering column jacket is accommodated in a housing of the steering column via bearing elements in the known manner.

At least one securing element, which engages a recess of the steering column jacket with at least one hook-shaped claw on one side and is supported at or in the end section of the steering column jacket via a radially directed shoulder on the other side, is arranged according to the present invention between the steering shaft and the steering column jacket. The radial shoulder may engage a recess in the inner jacket of the steering column jacket or be supported directly at the end section of the steering column jacket. The radial shoulder also forms at the same time an axial stop acting as a displacement limitation of the steering shaft in at least one direction.

A telescopic steering column according to the present invention may have a securing element with a plurality of claws. These may be arranged distributed over the circumference of the securing element and/or axially or radially offset in relation to one another. The securing element may be advantageously a shaped part made in one piece, with which a plurality of hook-shaped claws are made in one piece, which pass over into a cylindrical area with an inner jacket that is in contact with the outer circumference of the steering column jacket, wherein a plurality of claws may likewise be made in one piece with the cylindrical area at the other end, wherein the latter claws consist of an arc-shaped area each, which in turn passes over into an axially extending area, whose end piece forms a radial shoulder each. The steering shaft has at least one area with a cylindrical diameter, with which the axially extending area of the securing element is slidingly in contact. The sliding connection is necessary for the displaceability of the steering shaft part. The diameter of the cylindrical area should be smaller than the outer diameter of the teeth of the steering shaft.

According to another embodiment of the present invention, the area with the cylindrical outer diameter may be arranged between two areas of the steering shaft which are provided with axial teeth, wherein a number of guide paths, whose number corresponds to the number of the claws and in which the complementary axial areas of the securing element can be guided, are milled into the one of the toothed areas. It is especially advantageous for the securing element to be provided on both sides with three claws arranged offset by 120° in relation to one another. Symmetrical arrangement of the claws is thus obtained.

According to the present invention, the securing element should consist of an elastic material, e.g., plastic or metal. The elasticity is necessary to achieve a radial support of the steering column jacket in relation to the steering shaft. As a result, clearance and tolerance compensation is achieved between the components. It is simple in terms of manufacturing technology and therefore inexpensive to design the recesses in the steering column jacket as circular grooves.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
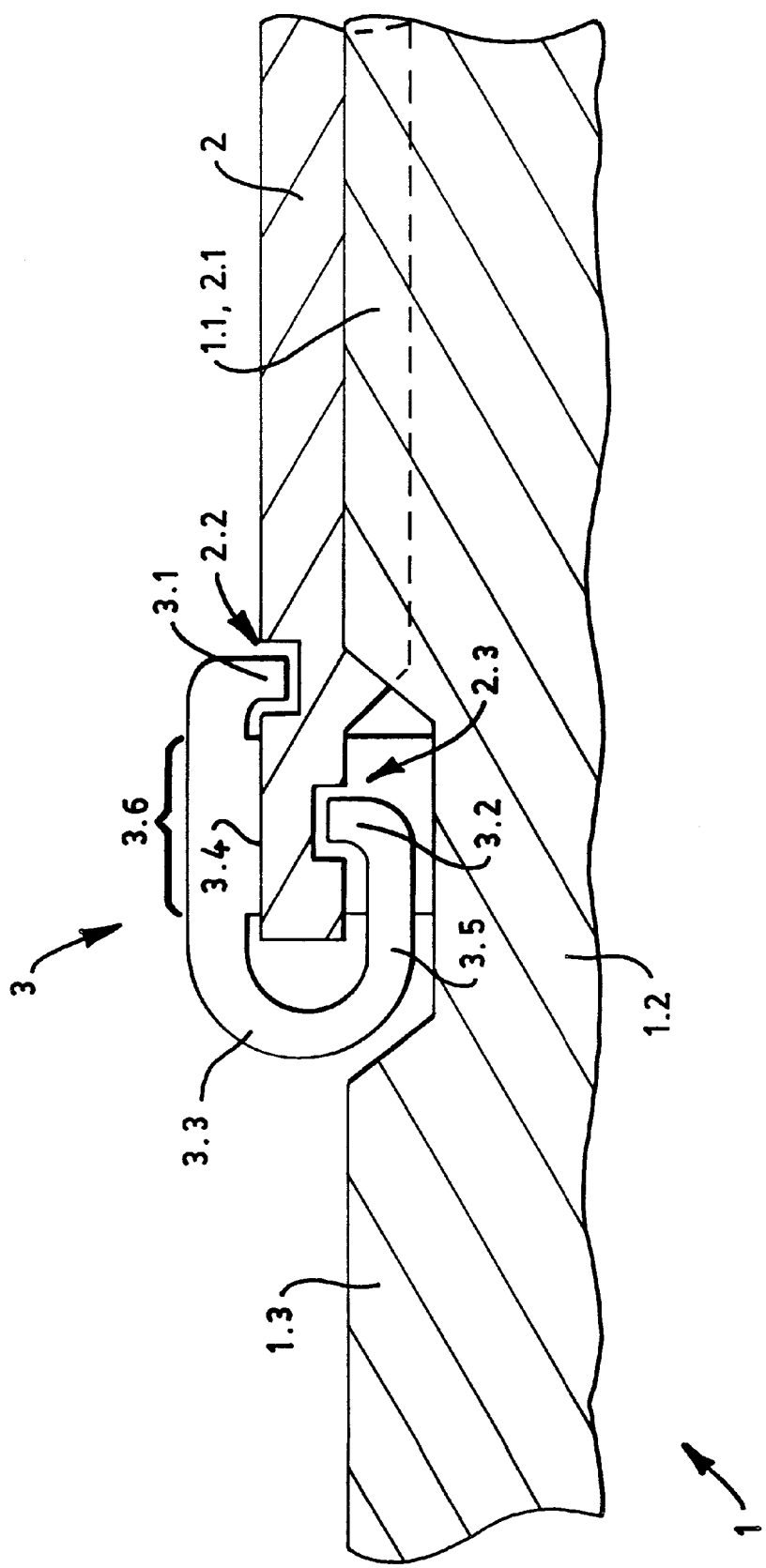
FIG. 1 is a sectional view of a detail of a telescopic steering column according to the present invention.

FIG. 1 shows a sectional view of a detail of a preferred embodiment of a telescopic steering column according to the present invention. This telescopic steering column for motor vehicles comprises a steering shaft 1, which has two areas provided with axial teeth 1.1 and 1.3. An area 1.2 with a cylindrical outer diameter is arranged between these areas. The axially extending, plastic-coated teeth 1.1 of the steering shaft 1 engage complementary teeth 2.1 of the steering column jacket 2 accommodating and guiding the steering shaft 1.

A securing element 3, made of plastic or an elastic material, is provided on the one side with three hook-shaped claws 3.1, arranged offset by 120°, which engage a recess 2.2 of the steering column jacket 2, which said recess is designed as a circular groove.

The securing element 3 is a shaped part made in one piece, whose hook-shaped claws 3.1 pass over into a cylindrical area 3.6 with an inner jacket 3.4 that is in contact with the outer circumference of the steering column jacket 2, and three claws likewise arranged offset by 120° are made in one piece with the cylindrical area 3.6 on the other side, wherein the said latter claws consist of an arc-shaped area 3.3, which in turn passes over into an axially extending area 3.5, whose end piece forms a radial shoulder 3.2 each. In this embodiment according to FIG. 1, this radially directed shoulder 3.2 engages a groove in the end section of the steering column jacket 2 and thus forms an axial displacement limitation of the steering shaft 1 in one direction.

The area 1.2 with the cylindrical outer diameter is arranged between two areas 1.1 and 1.3 of the steering shaft 1, which are provided with axial teeth, wherein a number of guide paths (not shown in FIG. 1), whose number corresponds to the number of the axial areas 3.5, and in which these axial areas 3.5 of the securing element 3 are guided, are milled into the toothed area 1.3.

Figure 2:
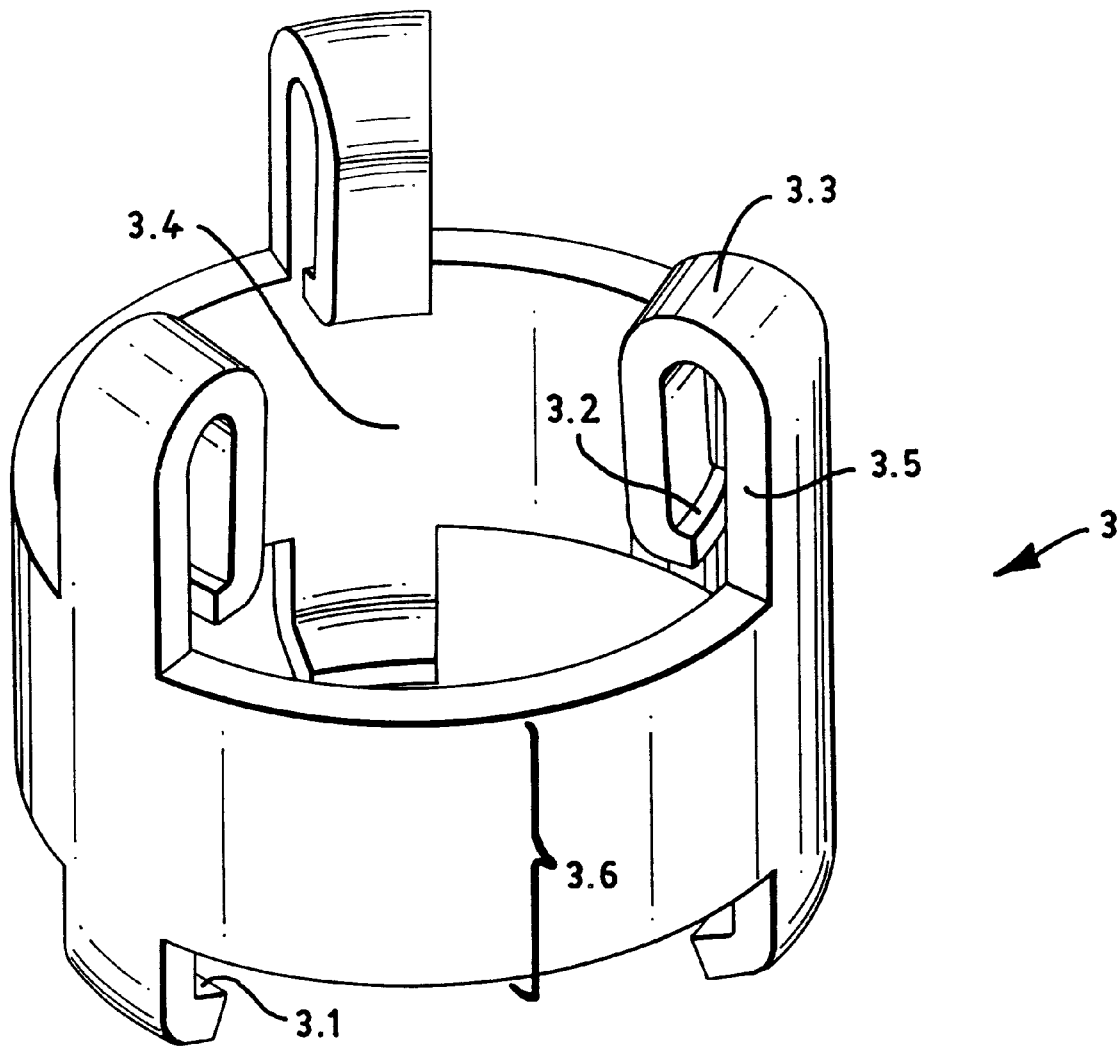
FIG. 2 is a schematic representation of a securing element according to the present invention.

The above-described securing element 3 is shown in FIG. 2 as a detail.

Figure 3:
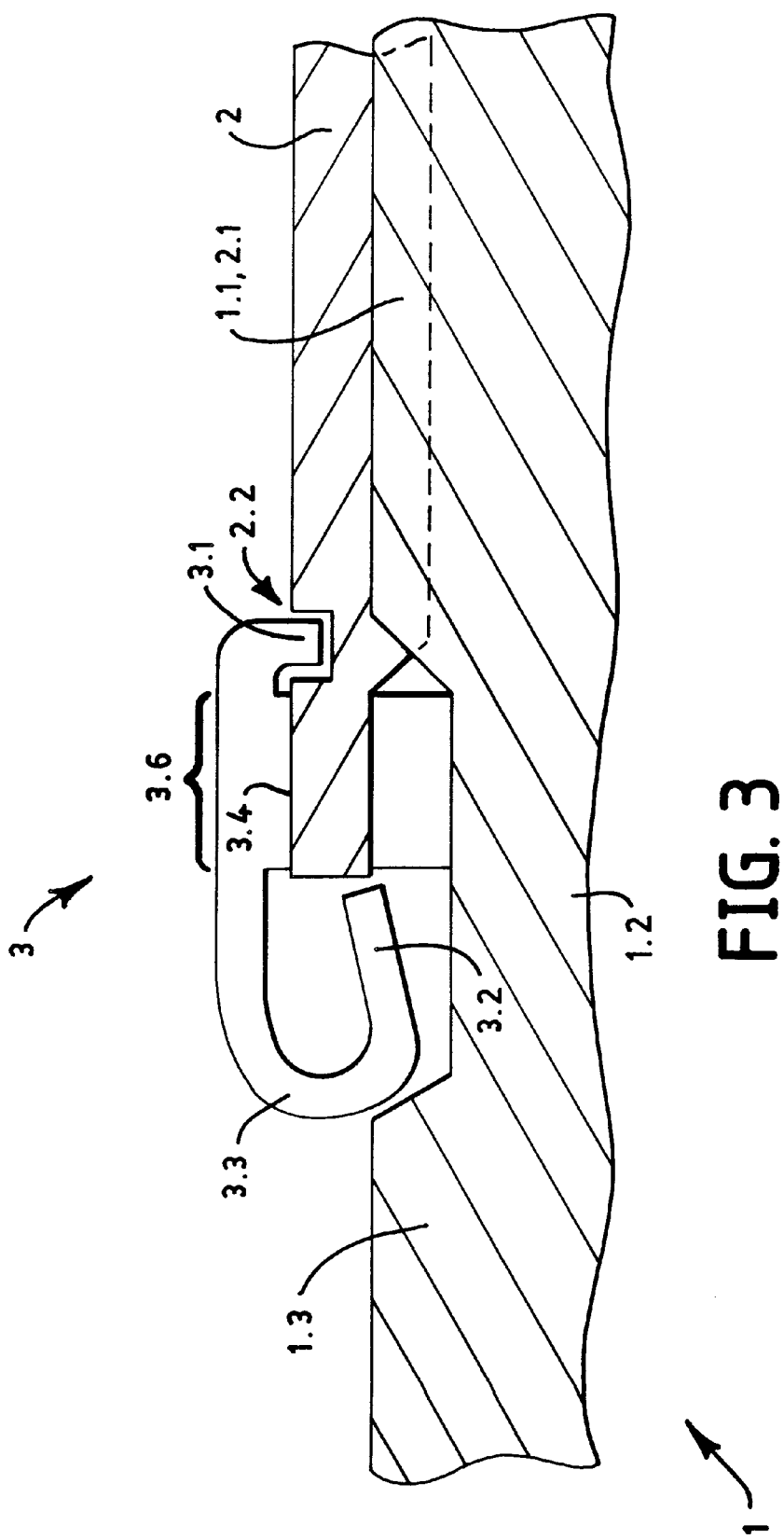
FIG. 3 is a sectional view of a detail of a telescopic steering column according to the present invention with another securing element according to the present invention.

FIG. 3 shows a sectional view of a detail of another preferred embodiment of a telescopic steering column according to the present invention. This telescopic steering column for motor vehicles comprises a steering shaft 1, which has two areas provided with axial teeth 1.1 and 1.3. An area 1.2 with a cylindrical outer diameter is arranged between these areas. The axially extending, plastic-coated teeth 1.1 of the steering shaft 1 engage complementary teeth 2.1 of the steering column jacket 2 accommodating and guiding the steering shaft 1.

A securing element 3, made of plastic or an elastic material, is provided on the one side with three hook-shaped claws 3.1 arranged offset by 120°, which engage a recess 2.2 of the steering column jacket 2, which said recess 2.2 is designed as a circular groove.

The securing element 3 is a shaped part made in one piece, whose hook-shaped claws 3.1 pass over into a cylindrical area 3.6 with an inner jacket 3.4 that is in contact with the outer circumference of the steering column jacket 2, wherein three claws, likewise arranged offset by 120°, are made in one piece with the cylindrical area 3.6 on the other side, wherein the said latter claws consist of an arc-shaped area 3.3, which in turn ends in a radially extending shoulder 3.2.

This radially extending shoulder 3.2 is supported at its end against the end of the steering column jacket 2. The axial displacement limitation of the steering shaft 1 is achieved by the teeth 1.1 of the steering shaft 1 coming into contact with the end of the radially extending shoulder 3.2.

The area 1.2 with the cylindrical outer diameter is arranged between the two areas 1.1 and 1.3 of the steering shaft 1 provided with axial teeth, wherein a number of guide paths (not shown in FIG. 3), whose number corresponds to the number of the radially extending areas 3.2, and in which these radially extending areas 3.2 of the securing element 3 are guided, are milled into the toothed area 1.3.

Figure 4:
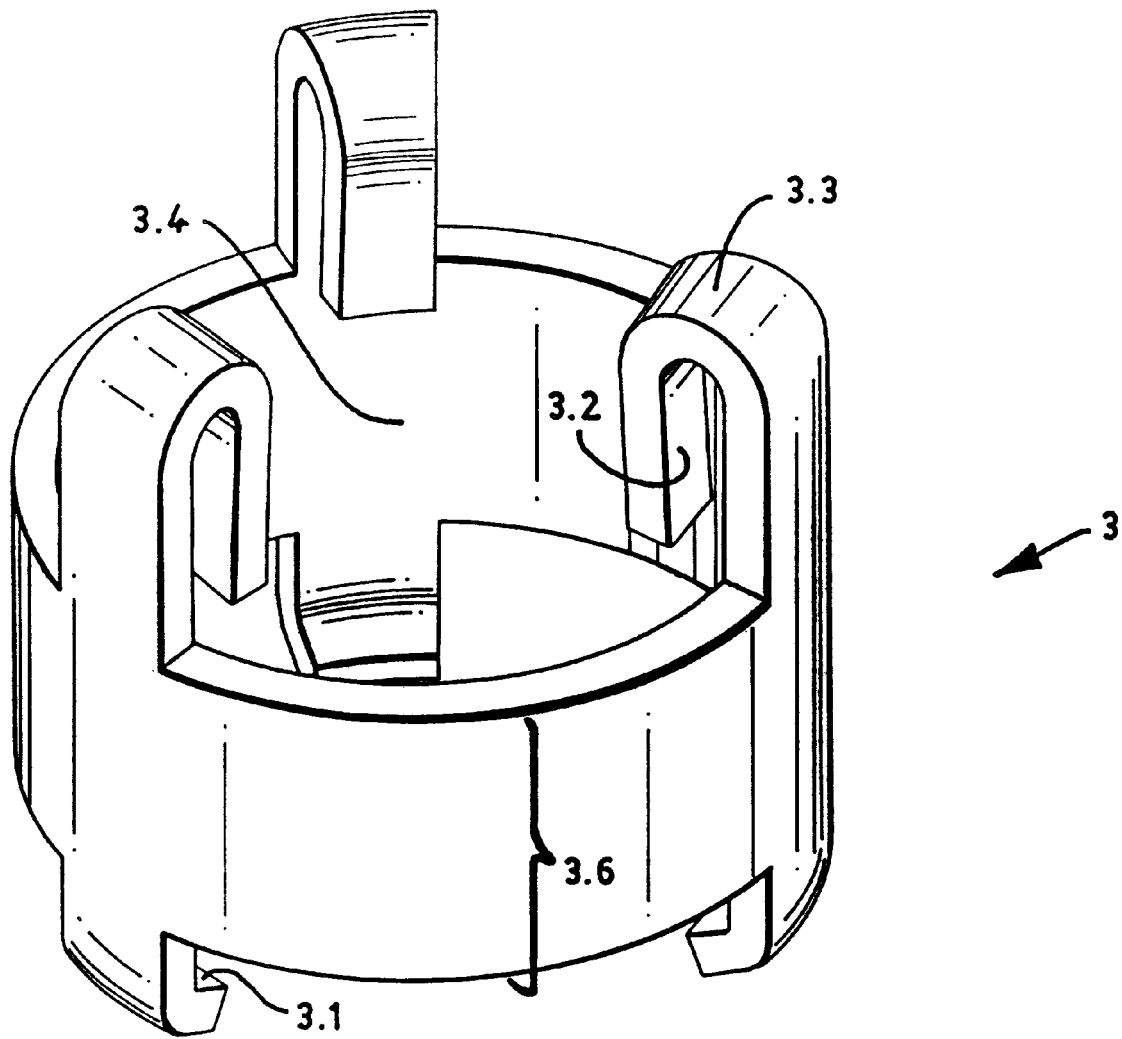
FIG. 4 is a schematic representation of a securing element according to the present invention according to FIG. 3.

FIG. 4 shows the above-described securing element 3 as an individual part.

While specific embodiments of the invention have been shown and described in detail to illustrate the application of the principles of the invention, it will be understood that the invention may be embodied otherwise without departing from such principles.

What is claimed is:

1. A telescopic steering column for motor vehicles, the telescopic steering column comprising:
   a steering shaft with axially extending plastic-coated teeth provided at least in some areas;
   a steering column jacket with complementary teeth engaging said teeth of said steering shaft, said steering column jacket accommodating and axially guiding the steering shaft and being accommodated in a housing of the steering column via bearing elements, said steering column jacket having a recess;
   a securing element engaging said recess on one side with at least one hook-shaped claw and supported on the one side in or at an end section of said steering column jacket via a radial shoulder to form an axial displacement limitation of said steering shaft in one direction and axial movement in an opposite direction.

2. The telescopic steering column in accordance with claim 1, wherein said securing element has a plurality of claws arranged distributed over the circumference of the securing element and/or axially or radially offset in relation to one another.

3. The telescopic steering column in accordance with claim 2, wherein said securing element is a shaped part made in one piece, said hook-shaped claws pass over into a cylindrical area with an inner jacket which is in contact with the outer circumference of said steering column jacket, wherein a plurality of claws are made in one piece with said cylindrical area, and said claws have an arc-shaped area, which in turn passes over into an axially extending area, whose end piece forms a radial shoulder.

4. The telescopic steering column in accordance with claim 3, wherein said steering shaft has a limited cylindrical area with a diameter that is smaller than an outer diameter of said teeth, with which said axially extending area of said securing element is slidingly in contact.

5. The telescopic steering column in accordance with claim 4, wherein said limited cylindrical area with a cylindrical outer diameter is arranged between two areas of said steering shaft, which are provided with axial teeth, wherein a number of guide paths, whose number corresponds to the number of said axial areas or of said radial shoulders, and in which said axial areas or said radial shoulders of said securing element are guided, are milled into said toothed area.

6. The telescopic steering column in accordance with claim 5, wherein said securing element has three claws arranged offset by 120° in relation to one another on one side and three said shoulders offset in relation to one another on the other side.

7. The telescopic steering column in accordance with claim 1, wherein said securing element includes an elastic material.

8. The telescopic steering column in accordance with claim 7, wherein said securing element is formed of plastic.

9. The telescopic steering column in accordance with claim 1, wherein said recesses are circular grooves.

10. A telescopic steering column for motor vehicles, the telescopic steering column comprising:

a steering shaft with axially extending plastic-coated teeth provided at least in some areas;

a steering column jacket with complementary teeth engaging said teeth of said steering shaft, said steering column jacket accommodating and guiding the steering shaft and being accommodated in a housing of the steering column via bearing elements, said steering column jacket having a recess;

a securing element engaging said recess on one side with at least one hook-shaped claw and supported on the one side in or at an end section of said steering column jacket via a radial shoulder to form an axial displacement limitation of said steering shaft in at least one direction, said securing element having a plurality of claws arranged distributed over the circumference of the securing element and/or axially or radially offset in relation to one another.

11. A telescopic steering column comprising:

a steering column jacket with a plurality of axially extending plastic-coated teeth, said steering column jacket having a recess;

a steering shaft positioned in said steering column jacket, said steering shaft having complementary teeth engaging with said teeth of said steering column jacket and axially guiding said steering shaft in said steering column jacket;

a securing element having a first hook-shaped claw engaging said recess on said steering column jacket, said securing element having a second hook-shaped claw positioned to limit axial movement of said steering shaft by contact with one of said teeth of said steering shaft.

12. The telescopic steering column in accordance with claim 11, wherein:

said second hook-shaped claw extends around an end of said steering column jacket.

13. The telescopic steering column in accordance with claim 12, wherein:

said steering shaft has a cylindrical area with a diameter smaller than an outer diameter of said teeth of said steering shaft;

said second hook-shaped claw extending radially between said diameter of said cylindrical area and said outer diameter of said teeth, said second hook-shaped claw limits one end of axial movement of said steering shaft and slides relative to said steering shaft in an area spaced from said one end of said axial movement;

said securing element is formed of elastic material.

14. The telescopic steering column in accordance with claim 11, wherein:

said second hook-shaped claw limits one end of axial movement of said steering shaft and slides relative to said steering shaft in an area spaced from said one end of said axial movement while said securing element is fixed to said steering column jacket.

15. The telescopic steering column in accordance with claim 11, wherein:

said securing element is formed of elastic material.

16. The telescopic steering column in accordance with claim 11, wherein:

said steering shaft has a cylindrical area with a diameter smaller than an outer diameter of said teeth of said steering shaft;

said second hook-shaped claw extending radially between said diameter of said cylindrical area and said outer diameter of said teeth.

* * * * *